United States Patent
Narasimhan et al.

(10) Patent No.: US 11,961,118 B2
(45) Date of Patent: *Apr. 16, 2024

(54) SYSTEM AND METHOD FOR TARGETING INDIVIDUALS WITH ADVERTISEMENT SPOTS DURING NATIONAL BROADCAST AND CABLE TELEVISION

(71) Applicant: Adcuratio Media, Inc., Burlington, MA (US)

(72) Inventors: Harish Narasimhan, Jersey City, NJ (US); Raj P. Kiran, Hyderabad (IN); Vivek Maheshwari, Uttar Pradesh (IN); Adam Kauppi, Toronto (CA); Dan Coronel, Burlington, MA (US); Ranjan Damodar, Burlington, MA (US)

(73) Assignee: Adcuratio Media, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,329

(22) Filed: Apr. 28, 2022

(65) Prior Publication Data

US 2022/0253899 A1 Aug. 11, 2022

Related U.S. Application Data

(63) Continuation of application No. 16/342,574, filed as application No. PCT/US2018/017890 on Feb. 13, 2018, now Pat. No. 11,636,516.

(Continued)

(51) Int. Cl.
*G06Q 30/02* (2023.01)
*G06Q 30/0251* (2023.01)
(Continued)

(52) U.S. Cl.
CPC ..... *G06Q 30/0254* (2013.01); *G06Q 30/0261* (2013.01); *G06Q 30/0273* (2013.01);
(Continued)

(58) Field of Classification Search
CPC ... G06Q 30/02–0277; H04N 21/25891; H04N 21/47815; H04N 21/4882; H04N 21/812
See application file for complete search history.

(56) References Cited

U.S. PATENT DOCUMENTS

2009/0150224 A1* 6/2009 Lu ..................... G06Q 30/0202
705/7.29

FOREIGN PATENT DOCUMENTS

WO WO-2009042304 A1 * 4/2009 ........... H04H 20/106

OTHER PUBLICATIONS

"Marketing Spot Optimization" ip.com Disclosure No. IPCOM000229301D Publicationdate: Jul. 19, 2013 (Year: 2013).*

* cited by examiner

*Primary Examiner* — Raquel Alvarez
(74) *Attorney, Agent, or Firm* — Maenner & Associates, LLC; Joseph E. Maenner

(57) ABSTRACT

The present invention relates to methods and systems for targeting and retargeting individuals with advertisement spots during television broadcasting. The method and system enable an advertiser for identifying and categorizing a set of viewers or individuals for retargeting advertisement based on parameters such as, but not limited to, interests or preferences of the individuals, past purchases and interactions of the individuals with the advertiser. The method and system further enable the advertiser to segregate the plurality of individuals into subgroups on the basis of information such as, but not limited to, demography, psychographic and behavioral characteristics of the plurality of individuals. The (Continued)

method and system then enable the advertiser to define one or more advertisement spots and corresponding advertisements to be delivered to different sub groups of individuals based on the categorization. Thereafter, the method and system retarget individuals by sending individualized messages in the one or more advertisement spots.

8 Claims, 2 Drawing Sheets

Related U.S. Application Data

(60) Provisional application No. 62/459,091, filed on Feb. 15, 2017, provisional application No. 62/458,570, filed on Feb. 13, 2017.

(51) Int. Cl.
*G06Q 30/0273* (2023.01)
*H04N 21/258* (2011.01)
*H04N 21/478* (2011.01)
*H04N 21/488* (2011.01)
*H04N 21/81* (2011.01)

(52) U.S. Cl.
CPC . *H04N 21/25891* (2013.01); *H04N 21/47815* (2013.01); *H04N 21/4882* (2013.01); *H04N 21/812* (2013.01)

SYSTEM AND METHOD FOR TARGETING INDIVIDUALS WITH ADVERTISEMENT SPOTS DURING NATIONAL BROADCAST AND CABLE TELEVISION

CROSS-REFERENCE TO RELATED APPLICATIONS

The present application claims priority from U.S. Provisional Patent Application Ser. No. 62/458,570, filed on Feb. 13, 2017 and to U.S. Provisional Patent Application Ser. No. 62/459,091, filed on Feb. 15, 2017, both of which are incorporated herein by reference in their entireties.

FIELD OF THE INVENTION

The present invention generally relates to the field of television advertising. More particularly, the present invention is in the technical field of targeting and retargeting individuals with advertisement spots during national cable and broadcast television.

BACKGROUND OF THE INVENTION

Advertisers or any agencies that operate on behalf of advertisers buy ad-spots from programmers ("TV Networks") in order to display their ad creative to target the tuned-in audience ("viewers").

An ad creative contains, in most cases video and audio messages to highlight features (e.g., comfort, safety, performance, etc.) and drive some type of consumer behavior (e.g., consideration, purchase, loyalty, brand perception, etc.), which correspond to specific brands or products owned by the advertiser and are created for a specific target audience or segment of viewers (e.g., 'creative A' was created specifically for females over the age of 30 that have purchased beauty products in the last 6 months). However, in the case of Network owned National Linear Television advertising inventory, an advertiser is currently restricted to only sending/streaming one ad creative per ad-spot. Network owned National Linear Television ad inventory represents approximately 14-16 minutes per 60-minute timeframe (network owed ad-spots are sold as full-avails only, one advertiser per ad spot). Non-Network owned inventory or inventory owned by a multi-channel video programming distributor ("MVPD") represents approximately 12 minutes per 60-minute timeframe (MVPD or Cable operator owned inventory can be sold as partial avails, more than one advertiser per ad-spot).

Moreover, to reach and target different segments of viewers effectively on Network owned National Linear Television ad inventory, an advertiser must purchase multiple ad-spots from a TV network to display multiple creatives and match available ad creatives to their respective targeted "wanted/intended" audience, thus resulting in a high cost and high number of wasted impressions. Viewers who view ad-spots not relevant to them would be described as an unwanted audience or wasted impression.

Therefore, considering the above, there is a need for an improved method and system for targeting individuals on Network owned, National Linear Television ad-spots during on cable and broadcast networks.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, the present invention provides a method and platform for targeting individuals on Network owned National Linear Television ad inventory. The platform includes a memory, a processor electronically connected to the memory, and an input/output module electronically connected to the processor. The input/output module is adapted to receive electronic input from an advertiser and is further adapted to provide an advertising purchase interface to the advertiser such that the advertiser can make a targeting purchase through the advertising purchase interface.

Additionally, the present invention provides a method for retargeting individuals on Network owned National Linear Television ad inventory, the method comprising the steps of: (a) enabling an advertiser to identify and categorize a set of individuals based on predefined parameters; (b) enabling the advertiser to segregate the individuals (or households) into subgroups based on the predefined filter parameters; (c) enabling the advertiser to define at least one advertising spot and a plurality of different ad creative such that different ad creative of the plurality of different ad creatives can be delivered to different viewer subgroups based on the predefined filter parameters; and (d) after step (c), retargeting the individuals by sending individualized ad creative to each of the individual viewers in one of the subgroups in the at least one Network owned National ad-spot.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
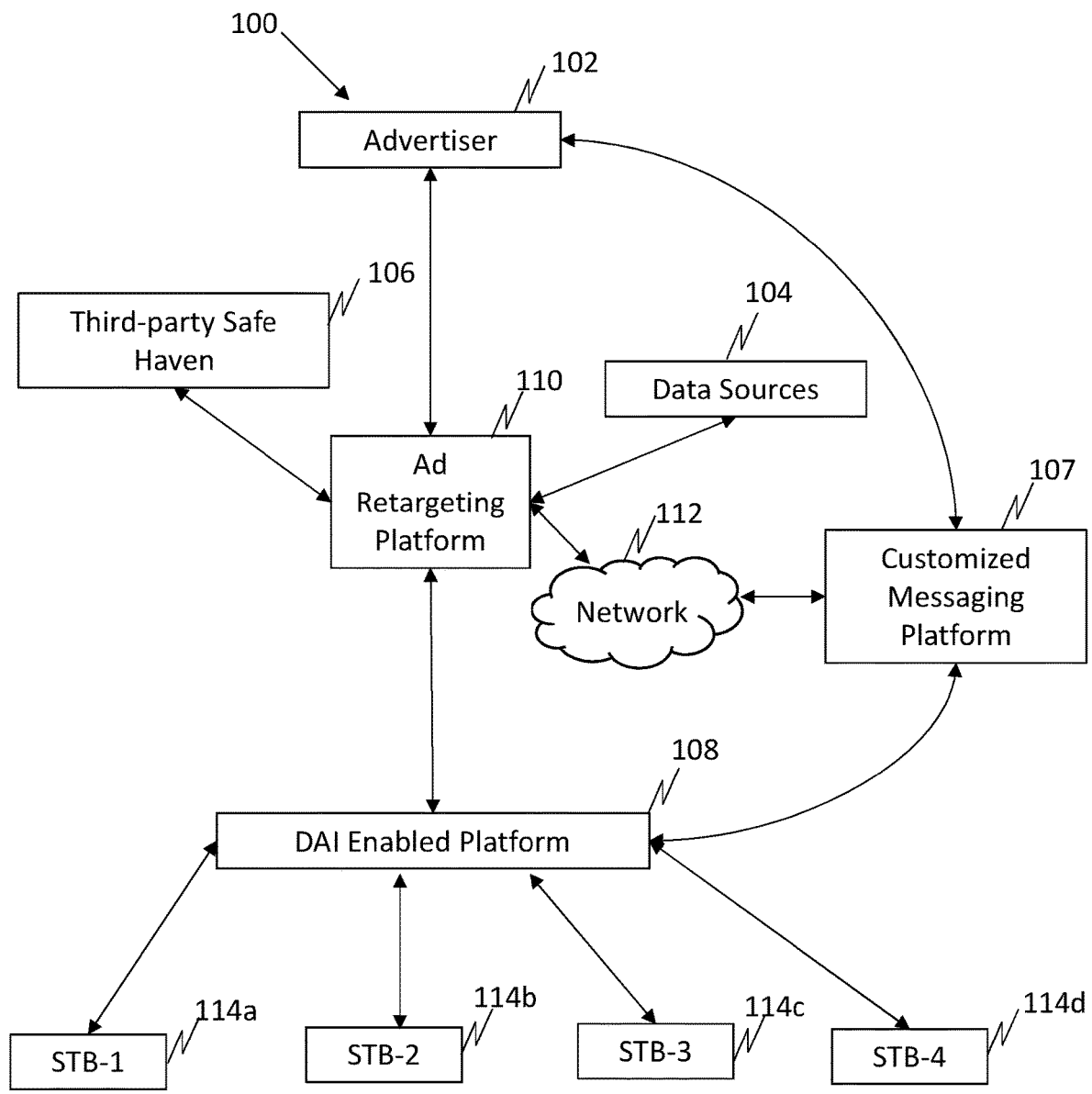
FIG. 1 illustrates a system for targeting and retargeting different audience segments with advertisement spots during television broadcasting in accordance with an embodiment of the invention.

In the drawings, like numerals indicate like elements throughout. Certain terminology is used herein for convenience only and is not to be taken as a limitation on the present invention. The terminology includes the words specifically mentioned, derivatives thereof and words of similar import.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Before describing in detail embodiments that are in accordance with the invention, it should be observed that the embodiments reside primarily in combinations of method steps and system components related to targeting and retargeting individuals with Network owned National Linear Television ad inventory. Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, platform, system, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Various embodiments of the present invention provide a method and system for targeting and retargeting individuals with advertisement spots during television broadcasting. First, the method and system enable advertisers to designate one or more ad spot(s) to be upgraded. When an ad spot is upgraded our system enables an advertiser to send more than one ad creative within one ad-spot based on pre-defined target audience segments and available ad creative. The method and System allows advertisers to display different "creatives" or "advertisements" to different audience segments across an entire country. By way of example, if a company, such as Fiat Chrysler Automobiles (FCA), had a new Dodge Durango they really wanted to push, they would approach a network and buy ad time in the middle of a new episode of, for example, "Young Sheldon". That is when the most eyes would be on their product. Then, the ad would run and FCA would hope that, of the millions of viewers tuning into the show, some would be in the market for the Dodge Durango. However, it is also known that there are viewers who are not in the market for an SUV, but are instead looking for a van, truck or car. The system and method according to the present invention would select and send to each household a Dodge Durango ad, a Chrysler 300 ad, a Dodge Caravan ad, and so on, depending on their preference.

Optionally, the method and system also allow an advertiser to define nation-wide target audience segments (based on specific characteristics, behaviors, preferences etc.) corresponding to individuals or households and send the most applicable ad-creative pertaining to a brand or product of the advertiser based on their desired business or campaign objective(s). Thereafter, the most appropriate ad-creative is identified and sent to each individual or household based on the audience segments defined by the advertiser through execution of the upgrade. Thus, the method and system display different ad creative to different audience segments during a single ad-spot.

The method and system further enable an advertiser to identify and categorize a set of viewers or individuals for retargeting advertisement based on parameters such as, but not limited to, interests or preferences of the individuals, past purchases and interactions of the individuals with the advertiser. For example, in the case of the automotive industry; retargeting individuals that recently test drove a vehicle or requested an online quote. Further, in the case of retail, retargeting individuals that recently entered a store identified through geofencing systems, made a purchase (in-store or online), or put items into an online shopping cart. The method and system further enable an advertiser to segregate the plurality of individuals into subgroups on the basis of multisource targeting data such as, but not limited to, demography, geographic, psychographic and other first, second or third party behavioral or propensity data characteristics of the plurality of individuals. The method and system then enable an advertiser to define one or more network owned national ad-spots and corresponding ad creative to be delivered to each subgroup(s) of individuals based on an advertiser's business objectives. Thereafter, the method and system retargets individuals by sending individualized ad-creative within one Network owned National Linear Television ad-spot.

The present invention requires orchestration between five industry participants: Media Agencies, National Advertisers, Data Providers, TV networks and dynamic ad insertion enabled platforms ("DAI enabled platform") such as, for example, MVPDs, Cable Operators, Smart TVs, Netflix, Streaming TV platforms, Video on Demand, etc. The present invention integrates several DAI enabled platforms with multiple technologies into the National Custom Messaging platform. In addition, the present invention also integrates all TV networks and their various technologies into the National Custom Messaging platform.

The present invention allows an advertiser to send individualized ad creative on television to a plurality of individuals based on pre-determined characteristics/behaviors/preferences, etc. of the plurality of individuals with a brand, sub-brand or product belonging to the advertiser.

The present invention also displays different ad creative to target individuals within a single Network owned National Television ad spot and can also deliver a specific sequence of different ad-creative. The sequence would define a pre-defined time and/or frequency threshold to the same individual or household for targeting different ads. The present invention allows for campaign design/message sequencing to be dynamic based on machine learning logic, segment patterns and dynamic multivariant tests in between and across the segment(s) or sub-segment(s) within a plurality of households or individuals. The present invention also applies a return on investment ("ROI") conversion based targeting strategy based on prior campaign results to future campaigns.

The present invention additionally allows an advertiser to retarget individuals by upgrading owned ad-spots and sending different custom messages to different sub groups.

Additionally, the present invention allows the advertiser to show customized messages to specific individuals during the last few seconds of an ad spot via text overlaying techniques based on an association of the plurality of individuals with a brand of the advertiser.

In another embodiment of the invention, the advertiser can trade their unwanted impressions from their ad spot in exchange for wanted impressions on other ad-spots.

Further, the present invention allows the advertiser to sell unwanted impressions from a selected ad spot buy, thus earning credits.

The present invention also lets the advertiser to directly pay or use account credits to retarget corresponding sub groups of individuals. In this case, the advertiser need not own networked owned National Linear Television ad inventory.

Additionally, the present invention provides a custom messaging platform having the ability to measure impressions as a function of reach times frequency per household segment within a Network owned National Linear Television ad-spot, as opposed to the current method of impressions equals reach times frequency, which aggregates all households, relevant or not. This type of reporting is enabled through upgrade instructions, as each instruction gets a "success" or "fail" result from each DAI enabled platform, thus allowing National Advertisers to measure their targeting effectiveness by segment. The inventive method provided measures the reach and frequency for each displayed creative by pre-defined household segment within one Network owned National Linear Television ad-spot.

While system 100 is described below in conjunction with television broadcasting, those skilled in the art will recognize that system 100 can be used with other platforms with which advertising is used such as, for example VOD, Netflix, Hulu, Roku, Sling TV, Streaming Boxes, ipTV, Smart TVs, YouTube, mobile apps, e-mail, direct mail, digital banner ads, telemarketing, or any individual targeting marketing medium.

FIG. 1 illustrates a system 100 for targeting and retargeting individuals with Network owned National Linear Television ad-spots during national television broadcasting in accordance with an embodiment of the invention.

As illustrated, system 100 includes various components and entities such as, but not limited to, an advertiser 102, data sources 104, a third-party safe haven 106, and a plurality of DAI enabled platforms 108.

Advertiser 102 and the plurality of DAI enabled platforms 108 are integrated into a customized messaging platform 107 via a network 112. Further, advertiser 102, data sources 104, third-party safe haven 106, and plurality of DAI enabled platforms 108 are also integrated into a separate ad retargeting platform 110 via network 112. Customized messaging platform 107 and ad retargeting platform 110 are further explained in detail in conjunction with FIG. 2.

Network 112 can include networks such as, but not limited to, cable television networks, internet, intranet, Local Area Network (LAN), Wireless Local Area Network (WLAN), Wireless Wide Area Network (WWAN), Wireless Metropolitan Area Network (WMAN), Wide Area Network (WAN) and telecommunication network.

Further, as illustrated in FIG. 1, plurality of DAI enabled platforms 108 communicate with a plurality of set-top boxes (STB) such as, but not limited to, STB-1 114a, STB-2 114b, STB-3 114c and STB-4 114d that transmits broadcast content to be displayed on a television set. The STBs 114a-114d belong to either a household, an individual, or an audience.

Figure 2:
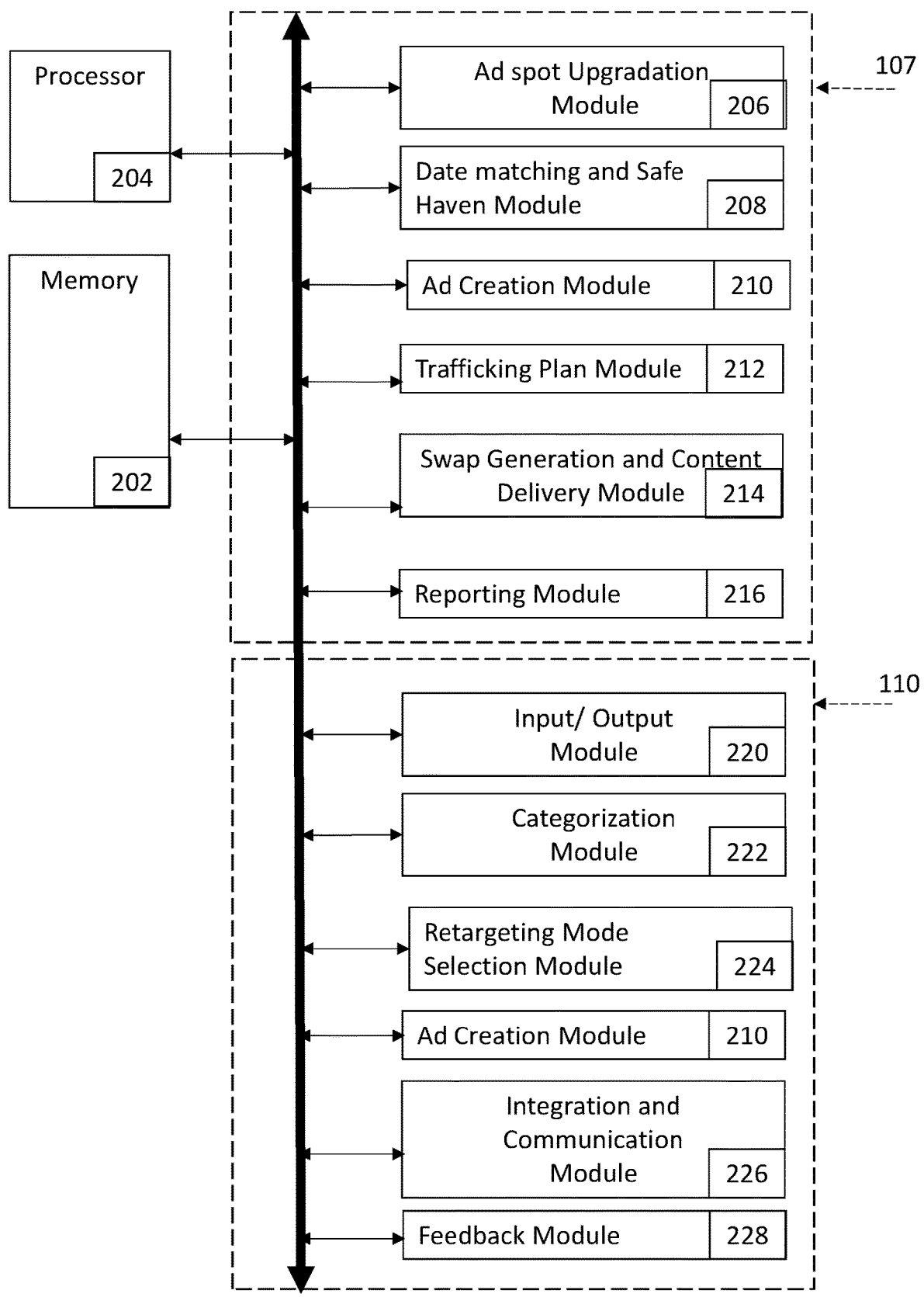
FIG. 2 illustrates a customized messaging platform for targeting and retargeting different audience segments with Network owned National Linear Television advertisement inventory in accordance with an embodiment of the invention.

FIG. 2 illustrates customizing messaging platform 107 and ad retargeting platform 110 for retargeting individuals with advertisement spots during television broadcasting in accordance with an embodiment of the invention.

As illustrated in FIG. 2, customized messaging platform 107 and ad retargeting platform 110 includes a memory 202 and a processor 204 communicatively coupled to memory 202. Further, customized messaging platform 107 and ad retargeting platform 110 each includes various modules that are communicatively coupled to memory 202 and processor 204. The various modules and their respective functionalities are explained in detail as follows.

Customized messaging platform 107 includes an ad spot upgradation module 206 that allows advertiser 102 to target different audience segments by upgrading one or more ad-spots belonging to advertiser 102.

In order to show different ad creative which appeal to different audience segments during a single network owned National Linear Television ad spot upgradation module 206 of customized messaging platform 107 allows upgradation of ad-spot(s) purchased by advertiser 102. Advertiser 102 shares various media plans by uploading through an interface provided by ad spot upgradation module 206. Ad spot upgradation module 206 then merges various media plans provided by advertiser 102 and provides an interface to advertiser 102 to view all the available ad-spots.

Advertiser 102 then designates specific ad spot(s) for upgrading by selecting the options available via the interface provided by ad spot upgradation module 206. Further, ad spot upgradation module 206 enables a network to choose a specific inventory for upgrade.

Further, customized messaging module 107 includes a data matching and safe haven module 208 for allowing advertiser 102 to create segments of audience or viewers based on attributes such as, but not limited to, demographic, psychographic and behavioral attributes. Data matching and third party safe haven module 208 combines data about individuals in households and presents an interface where advertiser 102 creates segments pertaining to the individuals in households by selecting the range or values of multiple attributes that define the individuals in households in order to define various audience segments. The purpose of the third party safe haven is to keep personally identifiable information ("PII") out of system 100, which prevents the advertiser and operator from sharing PII with one another. Essentially, the third party safe haven keeps all PII out of the hands of parties who do not need such information or out the hands of parties that should not have the PII from a legal perspective.

Advertiser 102 defines the audience segments by sharing partial information about the individuals in households in various segments by either manually uploading the information via data matching and safe haven module 208 or automating the process by integrating with advertiser Customer Relationship Management (CRM) systems. The data that is uploaded is then matched and a corresponding STB ID is identified for each individual or household without exposing any personal information about the individual by encrypting the data that is uploaded and matched.

Moving on, customized messaging platform 107 includes an ad creation module 210 that allows advertiser 102 to define ad-creatives to target each of the audience segments and to dynamically control the ad-creatives to show and sequence for each of the groups or clusters. An ad-creative is a video (generally with audio) advertisement itself, typically in durations of 15, 30 or 60 seconds. For example, the first 10 seconds can be the brand message; the second 10 seconds can be the product feature; and the last 10 seconds can be an offer/call-to-action message. For example, if we have three versions of each 10 second duration, we can create 27 unique versions of the ad creative. The ad creative is an object that contains all the data for visually and audibly rendering the ad itself. In an application programming interface ("API"), there are different types of ads that can be created. In the case of TV, ad creatives are video files (with audio); in the case of digital ads, ad creatives may be banners.

Ad creation module 210 provides an interface where advertiser 102 chooses an ad-creative and also chooses a specific segment to link from a plurality of audience segments associated with advertiser 102.

Advertiser 102 can also specify sequencing and pulsing of different ad-creatives to different segments by selecting the attributes provided via the interface of ad creation module 210. "Pulsing" combines flighting and continuous scheduling by using a low advertising level all year round and heavy advertising during peak selling periods. Product categories that are sold year-round but experience a surge in sales at intermittent periods are good candidates for pulsing. Exemplary product categories can be yard tools, which may be sold throughout the year, but experience a peak in the later winter-early spring months. Customized messaging platform 107 also includes a trafficking plan module 212 that combines all of the ad-spots of different networks that are selected by advertiser 102 for upgrade and presents an ad creative on the interface to networks for either an approval or rejection pertaining to the upgrade.

Trafficking plan module 212 also enables the networks to view and approve an ad-creative to display on the networks. The networks are presented with an interface to view the ad-creative or a Uniform Resource Locator (URL) for accessing the ad-creative.

Further, trafficking plan module 212 enables networks to share information pertaining to exact airtime of an ad spot using techniques such as, but not limited to, a network trafficking plan and adding an identifying cue tone (splice insert or time signal commands containing ad spot and advertiser ownership metadata details for upgrade execution) before the start of a Network owned National Linear Television ad spot in the programming stream to trigger the upgrade. The cue tone will be specific to identifying Network owned National Linear Television ad-spots that have been upgraded through the custom messaging platform.

Customized messaging platform 107 includes an ad-swap generation and content delivery module 214 for handling the generation of the required swap instructions and content delivery of the ad-creatives.

Ad-swap generation and content delivery module 214 generates a list of appropriate ad-creative and household pair for each ad spot and relays the instruction to swap the default ad-creative with an appropriate ad-creative.

The instructions to swap the ad-creative are relayed directly to the STB 114a-114d of the household, to the DAI enabled platform of a plurality of households, or to any node or equipment that delivers the content to the household. In a national ad spot, if one custom messaging enabled DAI enabled platform is showing individually addressable ads to its subscribers, then the subscribers of all other cable operators (i.e., non-custom messaging enabled operators) will see the default ad creative (i.e., underlying linear ad creative). Further, the instructions can be relayed in real-time (a few minutes before an actual custom messaging ad spot) or days before actual airing of the ad spot. Thereafter, the ad-creative are delivered to be swapped to STB 114a-114d from a stored system of ad-creatives via the content stream.

Swapped ads have to be physically sent to STB 114a-114d. There are two ways to send the upgrade ad spot creative (i.e., 15/30/60 second ad creative): 1. "In-advance", where the ad spot is sent to each STB 114a-114d in well in advance of the ad spot scheduled time. This would be done at times where there is an available tuner within a household, typically pre-scheduled spooling that occurs at a convenient time where limited bandwidth concerns exist, typically overnight. "In-advance" sending ad-spots are cached/spooled on/to the STB 114a-114d and do not use incremental bandwidth during the content stream itself; and 2. "Near real-time", where the ad spot is sent to each STB 114a-114d using bandwidth from the Operator (MVPD 108) and the STB 114a-114d does not cache/spool the upgraded ad creative.

Customized messaging platform 107 further includes a reporting module 216 that enables advertiser 102 to generate reports on the targeted impressions achieved in a campaign by selecting filters provided on an interface. A campaign can be multiple targeted or retargeted ad-spots. Advertiser 102 can view the reports on the advertiser user interface/portal or downloads the reports from the self-serve portal.

Reporting module 216 also enables advertiser 102 to view the impressions achieved per segment, Network or ad spot and to track the percentage of the targeted households reached as well as the frequency of the reach.

System 100 is also used to retarget individuals based on data and feedback from original advertising targeting, such as is described above. Ad retargeting platform 110 works in conjunction with customized messaging platform 107 by suggesting a sequence of messages or "next best action" based on a particular household's behavior. "Loop-back" of an action would need to be fed into the system 100. (E.g., user sees three ads but does not make purchase; change the ad to a deeper discount to further entice purchase). This will always depend on or be limited by the Advertiser's Business Objectives, budget and inventory of ad creatives.

Input/output module 220 provides an advertising purchase interface to advertiser 102 through which advertiser 102 makes a retargeting purchase. Input/output module 220 receives input from advertiser 102 pertaining to a plurality of individuals that advertiser 102 wishes to retarget. The input received from advertiser 102 includes information such as, but not limited to, past level of interaction of the plurality of individuals with advertiser 102 regarding the products of advertiser 102 (either online or offline), brands and competitors of advertiser 102, past purchases and details of post purchases of the plurality of individuals, implied purchase intent of the plurality of individuals, contract expiration details of the plurality of individuals, interests, opinions and awareness pertaining to the plurality of individuals and a position of advertiser 102 in the marketing funnel.

On receiving the input information, ad retargeting platform 110 includes a categorization module 222 that enables advertiser 102 to segregate the plurality of individuals further into subgroups on the basis of information such as, but not limited to, demography, psychographic and behavioral characteristics of the plurality of individuals.

For example, the categorization groups can be, but need not be limited to, interests of an individual pertaining to a brand or product, implied purchase intent, and purchase intent of the individual.

The interests of the individual are categorized based on online activities of the user such as, but not limited to, website visits, landing pages, duration on a page, extent of downloads, filling in request forms, search engines used by the individuals while searching for competitor's products and providing an email address during login or signup.

Further, the interests of the individual are also categorized based on offline activities of the user such as, but not limited to, location check-ins and geo-fencing. The implied purchase intents and the purchase intents of the individuals are derived and categorized based on online activities such as, but not limited to, purchase patterns of the individual, contract terms and items that the individual has added to cart. The offline activities include, but need not be limited to, test driving a car and asking for a price quote.

This categorization enables ad retargeting platform 110 to send more personalized ad-creative to individuals based on an individual's preferences and behavioral patterns and thus enables advertiser 102 to employ different forms to retarget potential customers. By way of example only, ad retargeting platform 110 provides bigger incentive ads if the individuals are a part of a list that corresponds to individuals who have been part of a retargeting campaign for a longer time.

In another example, ad retargeting platform 110, educates and classifies audiences who showed intent to purchase but did not purchase by displaying offers that are, for example, discounted. The individual or household segment that did not purchase any items are shown ads of, for example, less expensive products.

In yet another example, ad retargeting platform 110 retargets audiences who have already purchased something by providing new offers or add-ons related to complementary products in order to extract greater value from the audiences.

Once the categorization is done, ad retargeting platform 110 includes a retargeting mode selection module 224 to enable advertiser 102 to select a preferred mode for retargeting advertisements to the plurality of individuals.

Retargeting mode selection module 224 presents to advertiser 102 a plurality of retargeting advertisement modes for retargeting advertisements to the plurality of individuals for selection by advertiser 102. The plurality retargeting advertisement modes can be, but need not be limited to, custom messaging and trade exchange. Trade exchange relates to thresholds set by an Advertiser for the amount of trades between sub-brands or products within the Advertiser's portfolio. The amount of impressions given away by one brand needs to be within X % (defined by the Advertiser) of the impressions a brand received from other sub-brand or product within the Advertiser's portfolio, such as, for example, a reciprocal relationship of "give one, take one".

Ad retargeting platform 110 uses ad creation module 210 that enables advertiser 102 to define one or more advertisement spots and corresponding advertisements to be delivered to different sub groups of individuals. In accordance with an embodiment of the invention, advertiser 102 retargets the plurality of individuals by upgrading one or more advertisement spots of advertiser 102 via ad creation module 210 and sending different custom messages to different sub groups of individuals.

In order to upgrade an ad spot(s), advertiser 102 has to purchase an ad spot and designate it for upgrade. The media plan can contain information such as: Business Objectives; Target audience; Projections; TV Networks; Ad-spots purchased from which shows; Daypart; and Impression guarantees (GRPs). Ad creation module 210 then enables advertiser 102 to select one or more ad-spots from the purchased media plan on which advertiser 102 wants to retarget the advertisements.

In accordance with another embodiment of the invention, ad retargeting platform 110 enables advertiser 102 to sell unwanted impressions from a selected ad spot buy and to earn credits. The credits are then used for re-targeting sub groups of individuals on another advertiser's ad spot buy. An ad spot buy is the purchase of an ad spot from a TV Network. Ad-spots are purchased by Media Agencies on behalf of Advertisers in line (as best possible) with their target audience, business objectives and budget. Ad retargeting platform 110 also allows advertiser 102 to make a payment directly or to use account credits in order to retarget sub groups of individuals. Unwanted segments within an ad-spot are sent to a central repository where advertisers/agencies can purchase these unwanted segments in an open "stock market-like" environment.

After the individuals have been segregated into different groups and a preferred retargeting mode has been selected by advertiser 102, ad creation module 210 enables advertiser 102 to define an ad for retargeting by associating an ad creative to each group. Ad creation module 210 provides advertiser 102 with an ability to define the frequency of the ad over a prescribed time duration for the purpose of retargeting the viewer(s). Further, ad creation module 210 enables advertiser 102 to define the sequencing of ads and a day when the individuals should be retargeted.

Also, ad creation module 210 helps advertiser 102 in optimizing the sequencing, pacing or pulsing of ads which helps in pushing the individuals down the marketing funnel one step at a time. Further, ad creation module 210 enables advertiser 102 to create personalized messages for display to specific individuals in last few seconds of an ad spot by leveraging the text overlaying capabilities of ad creation module 210.

Ad retargeting platform 110 includes an integration and communication module 226 that integrates with plurality of DAI enabled platforms 108 via a cable networks system. Integration and communication module 226 enables advertiser 102 to obtain approval from plurality of broadcast or cable networks 112 for dynamically inserting ads meant for retargeting on the ad spot inventory submitted by advertiser 102. Besides approval, integration and communication module 226 also receives a trafficking plan, such as an exact time of the ad-spot at which it will be aired of the selected ad inventory.

Further, integration and communication module 226 integrates with multiple data sources 104 such as, but not limited to, first party Customer Relationship Management (CRM), Data Management Platform (DMP), and third-party data sources in order to obtain a list of individuals based on an input and a plurality of filters provides by advertiser 102 using input/output module 220 and categorization module 222. The list of individuals is maintained in data sources 104, wherein each individual is associated with a unique identifier that is not directly exposed while the list is retrieved by integration and communication module 226 in order to protect the privacy of the individuals. Further, advertiser 102 is also provided an option by input/output module 220 to share the list of individuals to be retargeted directly by uploading the list on to ad retargeting platform 110.

Integration and communication module 226 also interacts with third-party safe haven 106 in order to map details such as, but not limited to, name, email address or any other form of unique identifier pertaining to the individuals in the lists to corresponding household STB identifiers (IDs) corresponding to STBs 114a-114d. A synthetic ID is created for the operator of system 100 to send swap instructions to. Essentially, the third party safe haven keeps all PII out of the hands of parties who do not need such information or out the hands of parties that should not have the PII from a legal perspective.

Integration and communication module 226 then relays the instructions for swapping the ad creative to cable operator 108. The instructions are directly relayed to STBs 114a-114d either in real-time or non-real time. Thus, a different ad is dynamically swapped in place of an original default ad. In a national ad spot, if one cable operator is showing individually addressable ads to its subscribers, then the subscribers of all other cable operators will see the original default ad. The ad that is swapped depends on which list the identification of the particular STB 114a-114d belongs, wherein the list is a part of the multiple lists created on ad retargeting platform 110.

In an embodiment of the invention, ad retargeting platform 110 delivers a sequence of different ads separated by some time space to a same individual or household for retargeting. Additionally, ad retargeting platform 110 includes a feedback module 228 integrated with plurality of cable operators 108 for receiving feedback on either a success or failure status of the swap instructions that were relayed for swapping the advertisements.

Based on the feedback received from plurality of cable operators 108, ad retargeting platform 110 enables advertiser 102 to generate reports on the retargeted impressions achieved in a campaign by selecting filters provided on an interface. Ad retargeting platform 110 then enables advertiser 102 to view or download the reports.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention. Accordingly, the provisional specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements.

We claim:

1. A system for targeting and retargeting individuals for advertising, the system comprising:
    a memory;
    a processor electronically connected to the memory;
    a customized messaging platform electronically connected to the processor and to the memory, the customized messaging platform comprising:
        an ad creation module configured to allow an advertiser to define at least one ad-creative to target each of a plurality of audience segments and to dynamically control a plurality of ad-creatives to show and sequence for each of the audience segments, the ad creation module being electronically connected to the processor and to the memory, wherein the instructions to swap the ad-creative are relayed directly to an individual location;
    and
    a retargeting platform electronically connected to the processor and to the memory, the retargeting platform comprising:
        an input/output module electronically connected to the processor, the input/output module adapted to receive electronic input from an advertiser and further adapted to provide an advertising purchase interface to the advertiser such that the advertiser is able to make a retargeting purchase through the advertising purchase interface,
    wherein the ad spot is a National Linear television ad-spot owned by a network, wherein the cue tone includes splice insert and/or time signal commands containing the ad-spot and advertiser ownership metadata details for upgrade execution, and
    wherein the platform is configured for the network to choose a first specific network owned National Linear television ad spot from a plurality of stored ad spots for upgrade and transmission to a first subscriber and to choose a second specific network owned National Linear television ad spot from the plurality of stored ad spots for upgrade and transmission to a second subscriber.

2. The system according to claim 1, wherein the instruction to swap the ad-creative is relayed directly to an individual location.

3. The system according to claim 1, wherein the instruction is relayed in real-time.

4. The system according to claim 3, wherein the device does not cache the replacement ad creative.

5. The system according to claim 1, wherein the instruction is relayed days before an actual airing of the ad spot.

6. The system according to claim 5, wherein, after the instruction is executed, the ad spot is cached at the device.

7. The system according to claim 1, wherein the replacement ad-creative is selected from a stored system of ad-creatives via a content stream.

8. The system according to claim 7, wherein the ad spot does not use incremental bandwidth during the content stream.

* * * * *